US010206517B2

(12) United States Patent
Sugano et al.

(10) Patent No.: US 10,206,517 B2
(45) Date of Patent: *Feb. 19, 2019

(54) CELLULAR CUSHION

(71) Applicant: Skydex Technologies, Inc., Centennial, CO (US)

(72) Inventors: Eric W. Sugano, Arvada, CO (US); Collin Metzer, Highlands Ranch, CO (US); Peter M. Foley, Castle Rock, CO (US); Eric T. DiFelice, Parker, CO (US); Bryant R. Hadden, Westminster, CO (US)

(73) Assignee: Skydex Technologies, Inc., Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,051

(22) Filed: Apr. 6, 2017

(65) Prior Publication Data

US 2017/0208960 A1    Jul. 27, 2017

Related U.S. Application Data

(63) Continuation of application No. 14/533,367, filed on Nov. 5, 2014, which is a continuation of application (Continued)

(51) Int. Cl.
A47C 27/10 (2006.01)
A47C 27/00 (2006.01)
(Continued)

(52) U.S. Cl.
CPC .............. *A47C 27/10* (2013.01); *A47C 27/00* (2013.01); *A47C 27/142* (2013.01);
(Continued)

(58) Field of Classification Search
CPC .......... A47G 9/10; A47C 7/742; A47C 7/021; A47C 27/081; A47C 27/144;
(Continued)

(56) References Cited

U.S. PATENT DOCUMENTS 2,434,641 A * 1/1948 Burns .................. A47C 27/081
114/219
2,731,652 A * 1/1956 Bishop .................. A47C 7/021
217/35
(Continued)

*Primary Examiner* — Eric J Kurilla
(74) *Attorney, Agent, or Firm* — Holzer Patel Drennan

(57) ABSTRACT

A cellular cushioning system includes cells or support units arranged in one or more stacked arrays. The cells are hollow chambers that resist deflection due to compressive forces, similar to compression springs. The arrays are attached to one or more intermedial binding layers. The intermedial binding layer(s) links the cells together while allowing the cells to deform independently of one another. An external load compresses one of the void cells within an independent compression range without significantly compressing at least one void cell adjacent the compressed void cell. The independent compression range is the displacement range of the compressed void cell that does not significantly affect the compression of adjacent void cells. If the void cell is compressed beyond the independent compression range, the intermedial binding layers may be deflected and/or the void cells adjacent the compressed void cell may be compressed.

19 Claims, 17 Drawing Sheets

Related U.S. Application Data

No. 13/674,293, filed on Nov. 12, 2012, now Pat. No. 8,904,584.

(60) Provisional application No. 61/558,564, filed on Nov. 11, 2011.

(51) Int. Cl.

| | |
|---|---|
| *B29D 22/00* | (2006.01) |
| *B29C 65/00* | (2006.01) |
| *B29D 99/00* | (2010.01) |
| *B32B 37/10* | (2006.01) |
| *B32B 37/18* | (2006.01) |
| *B32B 37/24* | (2006.01) |
| *B65D 81/03* | (2006.01) |
| *A47C 27/14* | (2006.01) |
| *B32B 5/18* | (2006.01) |
| *B32B 7/04* | (2006.01) |
| *B29L 31/00* | (2006.01) |
| *B29K 105/04* | (2006.01) |

(52) U.S. Cl.
CPC .......... *B29C 66/1312* (2013.01); *B29C 66/21* (2013.01); *B29C 66/54* (2013.01); *B29C 66/71* (2013.01); *B29C 66/727* (2013.01); *B29D 22/00* (2013.01); *B29D 99/0092* (2013.01); *B32B 5/18* (2013.01); *B32B 7/04* (2013.01); *B32B 37/10* (2013.01); *B32B 37/182* (2013.01); *B32B 37/24* (2013.01); *B65D 81/03* (2013.01); *B29C 66/73921* (2013.01); *B29K 2105/045* (2013.01); *B29K 2995/0046* (2013.01); *B29L 2031/751* (2013.01); *B32B 2266/0292* (2013.01); *B32B 2266/06* (2013.01); *B32B 2307/50* (2013.01); *B32B 2398/20* (2013.01); *Y10S 5/932* (2013.01); *Y10T 156/10* (2015.01)

(58) Field of Classification Search
CPC ....... A47C 27/085; A47C 27/00; A47C 27/10; A61G 2007/05784; A42B 3/0486; A42B 3/06; A42B 3/10; A42B 3/12; A42B 3/121; A42B 3/122; A42B 3/125
See application file for complete search history.

(56) References Cited

U.S. PATENT DOCUMENTS

| | | | | |
|---|---|---|---|---|
| 3,705,429 A * | 12/1972 | Nail | ...... | A47C 27/081 5/710 |
| 4,547,919 A * | 10/1985 | Wang | ...... | A42B 3/122 2/18 |
| 4,662,012 A * | 5/1987 | Torbet | ...... | A47C 27/081 5/710 |
| 4,673,605 A * | 6/1987 | Sias | ...... | A61G 7/05707 428/120 |
| 4,982,466 A * | 1/1991 | Higgins | ...... | A47C 27/082 5/713 |
| 4,999,867 A * | 3/1991 | Toivio | ...... | A61G 7/05776 428/178 |
| 5,062,169 A * | 11/1991 | Kennedy | ...... | A47C 27/082 5/713 |
| 5,159,725 A * | 11/1992 | Larson | ...... | A47C 27/085 5/683 |
| 5,243,722 A * | 9/1993 | Gusakov | ...... | A47C 7/021 297/DIG. 3 |
| 5,572,804 A | 11/1996 | Skaja et al. | | |
| 5,586,348 A * | 12/1996 | Toivio | ...... | A61G 7/05776 5/710 |
| 5,638,565 A * | 6/1997 | Pekar | ...... | A47C 4/54 5/653 |
| 5,839,140 A * | 11/1998 | Wilkerson | ...... | A61G 5/1043 5/654 |
| 5,976,451 A | 11/1999 | Skaja et al. | | |
| 6,029,962 A | 2/2000 | Shorten et al. | | |
| 6,098,313 A | 8/2000 | Skaja | | |
| 6,189,168 B1 * | 2/2001 | Graebe | ...... | A47G 9/1027 5/490 |
| 6,256,819 B1 * | 7/2001 | Maier | ...... | A47C 7/185 297/452.26 |
| 6,415,467 B1 * | 7/2002 | Bretvin | ...... | A47C 4/54 5/654 |
| 6,510,573 B1 * | 1/2003 | Grabe | ...... | A47G 9/1027 5/490 |
| 6,677,026 B1 * | 1/2004 | Yates | ...... | A47C 27/085 297/452.41 |
| 6,777,062 B2 | 8/2004 | Skaja | | |
| 7,033,666 B2 | 4/2006 | Skaja | | |
| 7,574,760 B2 | 8/2009 | Foley et al. | | |
| 8,307,481 B2 * | 11/2012 | Katan | ...... | A61G 7/0573 5/709 |
| 8,714,071 B2 | 5/2014 | Foley et al. | | |
| 8,844,066 B1 * | 9/2014 | Whitcomb | ...... | A42B 3/121 2/413 |
| 8,904,584 B2 | 12/2014 | Sugano et al. | | |
| 8,915,339 B2 | 12/2014 | Kanous et al. | | |
| 8,990,987 B2 | 3/2015 | Wyman et al. | | |
| 2007/0226881 A1 * | 10/2007 | Reinhard | ...... | A42B 3/065 2/412 |
| 2014/0138196 A1 * | 5/2014 | Mazzucchelli | ...... | F16F 7/01 188/268 |
| 2014/0173812 A1 * | 6/2014 | Krueger | ...... | A42B 3/122 2/455 |
| 2014/0210250 A1 | 7/2014 | DiFelice | | |
| 2014/0304900 A1 | 10/2014 | Sugano et al. | | |
| 2015/0033577 A1 | 2/2015 | Dahl et al. | | |
| 2015/0052683 A1 | 2/2015 | Sugano et al. | | |
| 2015/0072103 A1 | 3/2015 | Tresso et al. | | |
| 2015/0075931 A1 | 3/2015 | Kanous et al. | | |
| 2015/0157135 A1 | 6/2015 | Wyman et al. | | |
| 2015/0276354 A1 | 10/2015 | Foley et al. | | |
| 2016/0066649 A1 | 3/2016 | Foley et al. | | |
| 2016/0331556 A1 * | 11/2016 | Wijesundara | ...... | B25J 15/0023 |
| 2018/0042331 A1 * | 2/2018 | Bologna | ...... | A42B 3/127 |

\* cited by examiner

CELLULAR CUSHION

CROSS-REFERENCE TO RELATED APPLICATIONS

The present application claims benefit of priority to U.S. Provisional Patent Application No. 61/558,564, entitled "Cellular Cushion" and filed on Nov. 11, 2011, which is specifically incorporated by reference herein for all that it discloses or teaches. In addition, the present application is a continuation of U.S. application Ser. No. 14/533,367 entitled "Cellular Cushion" and filed on Nov. 5, 2014, which is a continuation of U.S. application Ser. No. 13/674,293 entitled "Cellular Cushion," and filed on Nov. 12, 2012. Each of these applications is specifically incorporated by reference for all that it discloses or teaches.

BACKGROUND

Cushioning systems are used in a wide variety of applications including comfort and impact protection of the human body. A cushioning system is placed adjacent a portion of the body and provides a barrier between the body and one or more objects that would otherwise impinge on the body. For example, a pocketed spring mattress contains an array of close-coupled metal springs that cushion the body from a bed frame. Similarly, chairs, gloves, knee-pads, helmets, etc. may each include a cushioning system that provides a barrier between a portion of the body and one or more objects.

A variety of structures are used for cushioning systems. For example, an array of close-coupled closed-cell air and/or water chambers often constitute air and water mattresses. An array of close-coupled springs often constitutes a conventional mattress. Further examples include open or closed cell foam and elastomeric honeycomb structures. For cushioning systems utilizing an array of closed or open cells or springs, either the cells or springs are directly coupled together or one or more unifying layers are used to couple each of the cells or springs together at their extremities. While directly coupling the cells or springs together or indirectly coupling the extremities of the cells or springs together is effective in tying the cushioning system together, the independence of each of the cells or springs is reduced. This lack of independence can lead to an increased load being placed on a small area of the body (referred to herein as a point load). A point load deforming one of the cells or springs is likely to deform adjacent cells or springs directly or by stressing the unifying layer(s). As a result, the resistance to deflection at the point of contact increases due to the deflection of multiple cells or springs. The increased resistance to deflection may cause pressure points on portions of a user's body that protrude into the cushioning system more than other portions of the user's body (e.g., at a user's shoulders and hips on a mattress).

SUMMARY

Implementations described and claimed herein address the foregoing problems by decoupling individual void cells in a cellular cushioning system and allowing the void cells to deform independently of one another, within an independent deformation range. This reduces the potential for pressure points on a user's body. Further, the void cells deform independently under loads oriented in multiple directions, within the independent deformation range.

The presently disclosed technology further addresses the foregoing problems by compressing a void cell in a matrix of void cells coupled together with an intermedial binding layer in a direction normal to the intermedial binding layer without substantially compressing at least one adjacent void cell, wherein the void cell is compressed within an independent compression range of the void cell.

The presently disclosed technology still further addresses the foregoing problems by providing an apparatus for interfacing a body with an object comprising a first matrix of void cells and an intermedial binding layer coupling at least two of the void cells in the first matrix of void cells, wherein compression of a void cell in a direction normal to the intermedial binding layer occurs without substantial deflection of at least one adjacent void cell, wherein compression of the void cell is within an independent compression range of the void cell.

The presently disclosed technology further yet addresses the foregoing problems by providing a method of manufacturing a cellular cushioning system comprising molding a first matrix of void cells open toward and interconnected by a first intermedial binding layer; molding a second matrix of void cells open toward and interconnected by a second intermedial binding layer; and laminating the first and second intermedial binding layers together so that openings in the void cells of the first and second intermedial binding layers face one another, wherein compression of a void cell in a direction normal to the intermedial binding layer occurs without substantial deflection of at least one adjacent void cell, and wherein compression of the void cell is within an independent compression range of the void cell.

Other implementations are also described and recited herein.

BRIEF DESCRIPTIONS OF THE DRAWINGS

DETAILED DESCRIPTIONS

Figure 1:
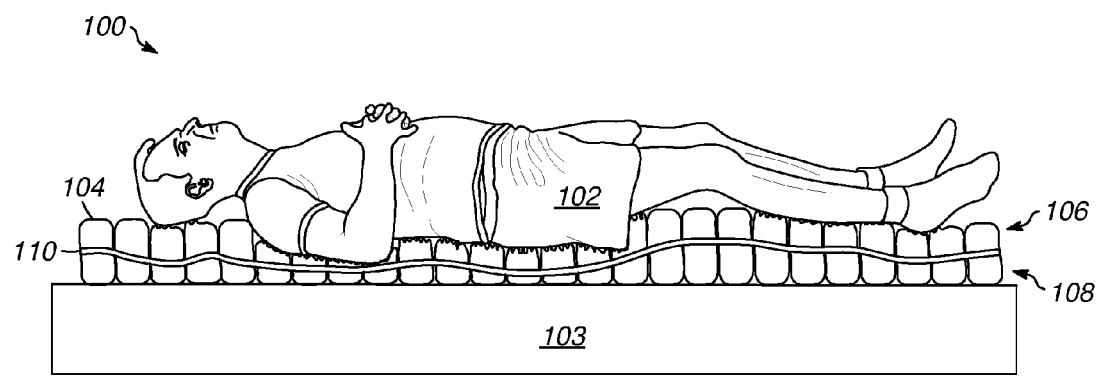
FIG. 1 illustrates a user lying on an example cellular cushioning system.

FIG. 1 illustrates a user 102 lying on an example cellular cushioning system 100. The cellular cushioning system 100 includes void cells (e.g., void cell 104) or support units arranged in a top matrix 106 (or array) and a bottom matrix 108 (or array). The cellular cushioning system 100 is depicted on a frame 103. Some implementations will not include the frame 103. The void cells are hollow chambers that resist deflection due to compressive forces, similar to compression springs. The top matrix 106 is attached to a top surface of a central or intermedial binding layer 110 and the bottom matrix 108 is attached to a bottom surface of the intermedial binding layer 110. The intermedial binding layer 110 links the void cells together while allowing the void cells to compress independently of one another, at least within an independent compression range of the void cells (discussed in more detail with regard to FIG. 13).

In one implementation, each of the void cells are individually attached to the intermedial binding layer 110 and not to each other. Further, each of the void cells within the top matrix 106 or bottom matrix 108 are individually compressible under load without compression of adjacent (i.e., neighboring, opposing, and/or neighbor opposing) void cells, within the independent compression range of the void cells. Outside of the independent compression range, compression of an individual void cell causes adjacent void cells to compress via deflection of the intermedial binding layer 110. For example, void cells forming the top matrix 106 under the neck, lower back, and knees of the user 102 are individually compressed and distribute the weight of the user 102 evenly over those areas. However, void cells under the upper back and buttocks of the user 102 are compressed sufficiently to cause the intermedial binding layer 110 to deflect, which in turn causes void cells in the bottom matrix 108 to compress. Deflection of the intermedial binding layer 110 also causes adjacent void cells in the top matrix 106 to deflect and adjacent void cells in the bottom matrix 108 to compress.

Each of the void cells creates a relatively constant force to resist deflection. In one implementation, the void cells in the bottom matrix 108 have a higher resistance to deflection that the void cells in the top matrix 106. As a result, in less compressed areas (e.g., the user's neck, lower back, and knees), only void cells in the top matrix 106 are engaged and the user's weight is distributed evenly over contact of the user 102 with the cellular cushioning system 100. In more compressed areas (e.g., the user's upper back and buttocks), the user experiences increased pressure because the user's weight is sufficient to additionally deflect the intermedial binding layer 110 and thus engage the void cells in the bottom matrix 108. In another implementation, resistance to deflection of the individual void cells within the top and/or bottom matrices are varied according to expected loading of the cellular cushioning system 100. For example, void cells located near the user's upper back and buttocks may be stiffer than void cells located near the user's neck, lower back, and knees.

In one implementation, an optional pixilation layer (see e.g., FIGS. 8-11) is attached to extremities of the top matrix 106 and/or the bottom matrix 108 opposite the intermedial binding layer 110. The pixilation layer provides a substantially planar surface on the top or bottom of the cellular cushioning system 100 to aid in comfort or cleanliness concerns and yet sill allows for substantially independent compression of individual void cells, for example. The pixilation layer is discussed in more detail with regard to FIGS. 8-11.

Figure 2:
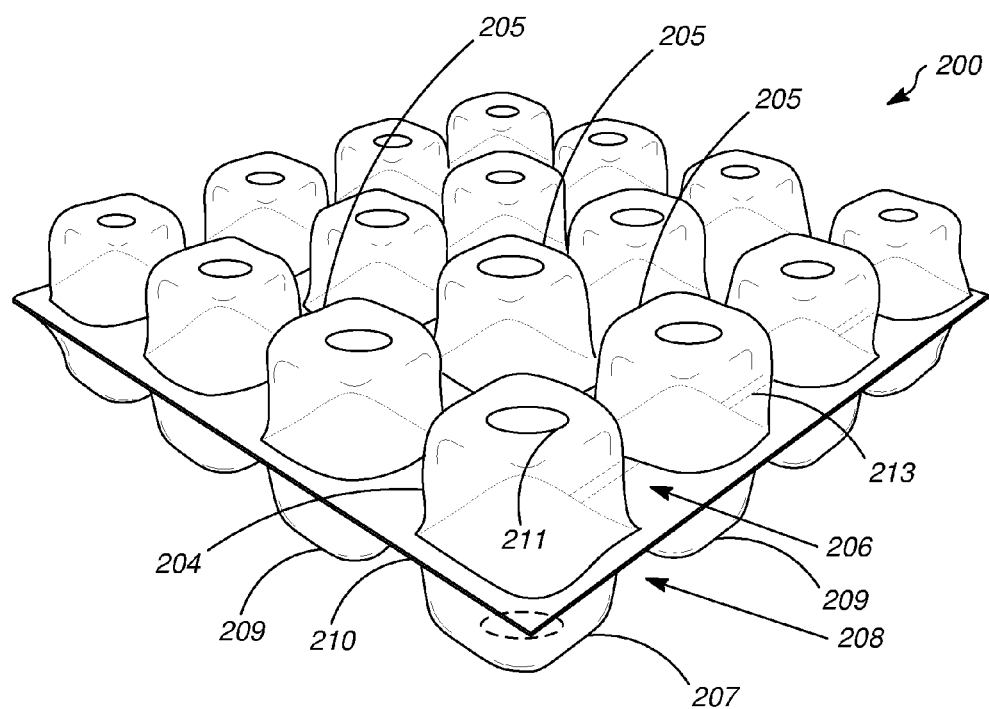
FIG. 2 illustrates a perspective view of an example cellular cushioning system.

FIG. 2 illustrates a perspective view of an example cellular cushioning system 200. The cellular cushioning system 200 includes void cells (e.g., void cell 204) arranged in a top matrix 206 and a bottom matrix 208. The void cells are hollow chambers that resist deflection due to compressive forces, similar to compression springs. However, unlike compression springs, deflection of the void cells does not yield a linear increase in resistive force. Instead, the resistive force to deflection of the void cells is relatively constant for the majority of the void cell's compression displacement. This allows the cellular cushioning system 200 to conform to a user's body with an even force on the user's body. In other implementations, each of the void cells may have a positive or negative spring rate. Further, the spring rate of each of the void cells may vary depending upon the void cell's relative position within the cellular cushioning system 200.

At least the material, wall thickness, size, and shape of each of the void cells define the resistive force each of the void cells can apply. Materials used for the void cells are generally elastically deformable under expected load conditions and will withstand numerous deformations without fracturing or suffering other breakdown impairing the function of the cellular cushioning system 200. Example materials include thermoplastic urethane, thermoplastic elatomers, styrenic co-polymers, rubber, Dow Pellethane®, Lubrizol Estane®, Dupont™ Hytrel®, ATOFINA Pebax®, and Krayton polymers. Further, the wall thickness may range from 5 mil to 80 mil. Still further, the size of each of the void cells may range from 5 mm to 70 mm sides in a cubical implementation. Further yet, the void cells may be cubical, pyramidal, hemispherical, or any other shape capable of having a hollow interior volume. Other shapes may have similar dimensions as the aforementioned cubical implementation. Still further, the void cells may be spaced a variety of distances from one another. An example spacing range is 2.5 mm to 150 mm.

In one implementation, the void cells have a square base shape, with a trapezoidal volume and a rounded top. That void cell geometry may provide a smooth compression profile of the system 200 and minimal bunching of the individual void cells. Bunching occurs particularly on corners and vertical sidewalls of the void cells where the material buckles in such a way as to create multiple folds of material that can cause pressure points and a less uniform feel to the cellular cushioning system overall. Still further, rounded tops of the void cells may enhance user comfort and the spacing of the individual void cells may create a user feel similar to convoluted foam.

In another implementation, the void cells have a round base shape, with a cylindrical-shaped volume and a rounded top. That void cell geometry may also provide a smooth compression profile of a cellular cushioning system and minimal bunching of the individual void cells. Still further, the rounded tops may enhance user comfort and the closer spacing of the individual void cells (as compared to the void cells of FIG. 13) may create a more uniform feel to a user. Other void cell shapes are contemplated herein.

The material, wall thickness, cell size, and/or cell spacing of the cells within the cellular cushioning system 200 may be optimized to minimize generation of mechanical noise by compression (e.g., buckling of the side walls) of the void cells. For example, properties of the cells may be optimized to provide a smooth relationship between displacement and an applied force (see e.g., FIGS. 13 and 14). Further, a light lubricating coating (e.g., talcum powder or oil) may be used on the exterior of the void cells to reduce or eliminate noise generated by void cells contacting and moving relative to one another. Reduction or elimination of mechanical noise may make use of the cellular cushioning system 200 more pleasurable to the user. Still further, geometry of the top of the void cells may be smooth to enhance user comfort.

The top matrix 206 is attached to a top surface of a central or intermedial binding layer 210 and the bottom matrix 208 is attached to a bottom surface of the intermedial binding layer 210. The intermedial binding layer 210 links the void cells together while allowing the void cells in the top matrix 206 to deform independently of one another, at least to an extent. The intermedial binding layer 210 may be constructed with the same potential materials as the void cells and in one implementation is contiguous with the void cells. In the cellular cushioning system 200, the void cells in the top matrix 206 align with the void cells in the bottom matrix 208.

Figure 4:
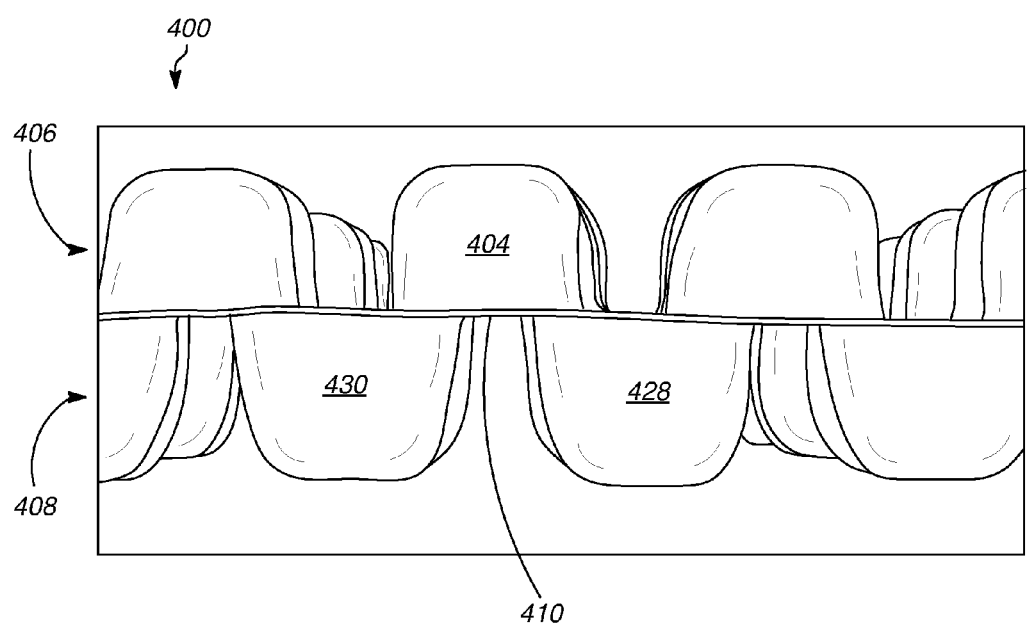
FIG. 4 illustrates an elevation view of an example offset cellular cushioning system in an unloaded state.

In other implementations, the void cells in the top matrix 206 are not aligned with the void cells in the bottom matrix 208 (see e.g., FIG. 4). In yet other implementations, the void cells in the top matrix 206 are a substantially different size and/or shape than the void cells in the bottom matrix 208. Further still, one or more coupling ribs (not shown) may be attached to the exterior of the void cells extending vertically to the intermedial binding layer 210. These ribs can add additional stiffness to the void cells, but may in some implementations affect the independency of the void cells.

Each void cell is surrounded by neighboring void cells within a matrix. For example, void cell 204 is surrounded by three neighboring void cells 205 within the top matrix 206. In cellular cushioning system 200, there are three neighboring void cells for each corner void cell, five neighboring void cells for each edge cell, and eight neighboring void cells for the rest of the void cells. Other implementations may have greater or fewer neighboring void cells for each void cell. Further, each void cell has a corresponding opposing void cell within an opposite matrix. For example, void cell 204 in the top matrix 206 is opposed by void cell 207 in the bottom matrix 208. Other implementations do not include opposing void cells for some or all of the void cells. Still further, each void cell has corresponding neighbor opposing cells within an opposite matrix. For example, void cell 204 in the top matrix 206 has corresponding neighbor opposing cells 209 in the bottom matrix 208. The neighbor opposing cells are opposing void cells for each neighboring void cell of a particular void cell.

The neighboring void cells, opposing void cells, and neighbor opposing cells are collectively referred to herein as adjacent void cells. In various implementations, one or more of the neighboring void cells, opposing void cells, and opposing neighbor void cells are not substantially compressed within an independent compression range of an individual void cell.

In one implementation, the void cells are filled with ambient air. In another implementation, the void cells are filled with a foam or a fluid other than air. The foam or certain fluids may be used to insulate a user's body, facilitate heat transfer from the user's body to/from the cellular cushioning system 200, and/or affect the resistance to deflection of the cellular cushioning system 200. In a vacuum or near-vacuum environment (e.g., outer space), the hollow chambers may be un-filled.

Further, the void cells may have one or more holes (e.g., hole 211) through which air or other fluid may pass freely when the void cells are compressed and de-compressed. By not relying on air pressure for resistance to deflection, the void cells can achieve a relatively constant resistance force to deformation. Still further, the void cells may be open to one (i.e., fluidly connected) another via passages (e.g., passage 213) through the intermedial binding layer 210. The holes and/or passages may also be used to circulate fluid for heating or cooling purposes. For example, the holes and/or passages may define a path through the cellular cushioning system 200 in which a heating or cooling fluid enters the cellular cushioning system 200, follows a path through the cellular cushioning system 200, and exits the cellular cushioning system 200. The holes and/or passages may also control the rate at which air may enter, move within, and/or exit the cellular cushioning system 200. For example, for heavy loads that are applied quickly, the holes and/or passages may restrict how fast air may exit or move within the cellular cushioning system 200, thereby providing additional cushioning to the user.

The holes may be placed on a top of a void cell and a bottom of an opposing void cell on the cellular cushioning system 200 to facilitate cleaning. More specifically, water and/or air could be forced through the holes in the opposing void cells to flush out contaminants. In an implementation where each of the void cells are connected via passages, water and/or air could be introduced at one end of the cellular cushioning system 200 and flushed laterally through the cellular cushioning system 200 to the opposite end to flush out contaminants. Further, the cellular cushioning system 200 could be treated with an anti-microbial substance or the cellular cushioning system 200 material itself may be anti-microbial.

The cellular cushioning system 200 may be manufactured using a variety of manufacturing processes (e.g., blow molding, thermoforming, extrusion, injection molding, laminating, etc.). In one implementation, the system 200 is manufactured in two halves, a first half comprises the top matrix 206 attached to an upper half of the intermedial binding layer 210. The second half comprises the bottom matrix 208 attached to a lower half of the intermedial binding layer 210. The two halves of the intermedial binding layer 210 are then laminated, glued, or otherwise attached together with the top matrix 206 and the bottom matrix 208 on opposite sides of the intermedial binding layer 210. In one implementation, the two halves of the intermedial binding layer 210 are periodically bonded together, leaving a gap between the two halves of the intermedial binding layer 210 that fluidly connects the void cells in one or both of the top matrix 206 and the bottom matrix 208.

Further, each of the void cells in the two halves may be open or closed at its interface with the intermedial binding layer 210. As a result, when the two halves are joined, opposing void cells on the top matrix 206 and bottom matrix 208 may be either open or closed to each other. In another implementation, the cellular cushioning system 200 is manufactured in one piece rather than two pieces as discussed above. Further, a cellular cushioning system 200 according to the presently disclosed technology may include more than two matrices of void cells stacked on top of one another (e.g., two or more cellular cushioning systems 200 stacked on top of one another).

Figure 3:
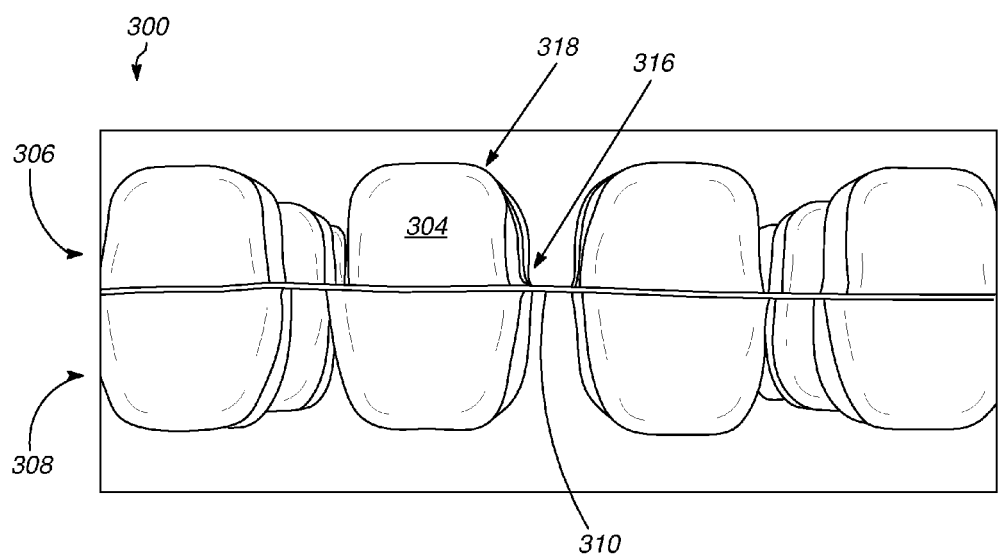
FIG. 3 illustrates an elevation view of an example cellular cushioning system in an unloaded state.

FIG. 3 illustrates an elevation view of an example cellular cushioning system 300 in an unloaded state. The cellular cushioning system 300 includes void cells (e.g., void cell 304) arranged in a top matrix 306 and a bottom matrix 308. The top matrix 306 is attached to a top surface of a central or intermedial binding layer 310 and the bottom matrix 308 is attached to a bottom surface of the intermedial binding layer 310. The intermedial binding layer 310 links the void cells together while allowing the void cells to deform independently of one another, at least within an independent compression range of the void cells.

In one implementation, the thickness of each of the void cells varies over a height of the void cell. For example, near bottom 316 of void cell 304, the wall thickness may be greater than near top 318 of void cell 304, or vice versa. This phenomenon may be a by-product of the manufacturing process or may be intentionally designed into the manufacturing process. Regardless, varying the thickness of the void cells over their height can be used to yield a changing resistive force depending upon the amount of compression of the void cells (i.e., yielding a positive and/or increasing spring rate).

In another implementation, the height of the void cells in the bottom matrix 308 is different than the height of the void cells in the top matrix 306. In yet another implementation, the size and shape of the void cells in the top matrix 306 differ substantially than that in the bottom matrix 308. The void cells in the top matrix 306 may substantially collapse into the void cells in the bottom matrix 308 under compression, or vice versa. In other implementations, void cells in the top matrix 306 and the bottom matrix 308 may be offset such that they are only partially opposing or not opposing (see e.g., FIG. 4).

FIG. 4 illustrates an elevation view of an example offset cellular cushioning system 400 in an unloaded state. The cellular cushioning system 400 includes void cells (e.g., void cell 404) arranged in a top matrix 406 and a bottom matrix 408. The void cells in the top matrix 406 are offset from those in the bottom matrix 408 such that each void cell in a matrix overlaps 2 or more opposing void cells. The top matrix 406 is attached to a top surface of a central or intermedial binding layer 410 and the bottom matrix 408 is attached to a bottom surface of the intermedial binding layer 410. The intermedial binding layer 410 links the void cells together while allowing the void cells to deform independently of one another, at least within an independent compression range of the void cells.

For example, void cell 404 in the top matrix 406 overlaps void cells 428, 430 in the bottom matrix 408 (i.e., 1:2 overlapping). In some implementations, the void cell 404 in the top matrix 406 also overlaps 2 additional void cells in the bottom matrix 408 extending into the depicted illustration (i.e., 1:4 overlapping). If void cell 404 is compresses, it will deform substantially independently within an independent compression range of the void cell 404. Outside of the independent compression range of the void cell 404, compression of the system 400 will largely engage void cells 428, 430 and to a lesser extent, neighboring void cells via the intermedial binding layer 410. Further, the overlapping cells provide fluid passageways between the void cell in the top matrix 406 and the bottom matrix 408. This allows air or other fluid within a compressed void to enter and exit the void cell freely or substantially freely. In other implementations, one void cell in the top matrix 406 may overlap any number of void cells in the bottom matrix 408 (e.g., 1:3 overlapping, 1:6 overlapping, etc.).

Figure 5:
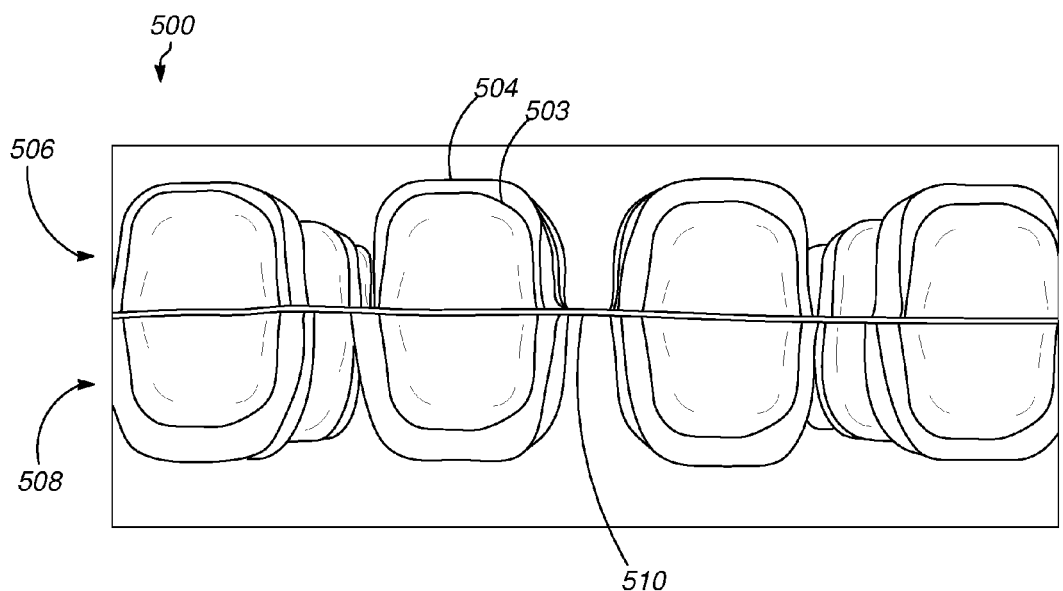
FIG. 5 illustrates an elevation view of an example stacked cellular cushioning system 500 in an unloaded state.

FIG. 5 illustrates an elevation view of an example stacked cellular cushioning system 500 in an unloaded state. The cellular cushioning system 500 includes void cells (e.g., void cells 503, 504) stacked within one another. Stacking void cells within one another increases the resistance to deflection of the combined stacked void cell. In one implementation, void cell 503 is smaller than void cell 504 to allow a better fit. Further, the void cells are arranged in a top matrix 506 and a bottom matrix 508. The top matrix 506 is attached to a top surface of a central or intermedial binding layer 510 and the bottom matrix 508 is attached to a bottom surface of the intermedial binding layer 510. The intermedial binding layer 510 links the void cells together while allowing the void cells to deform independently of one another, at least within an independent compression range of the void cells.

Figure 6:
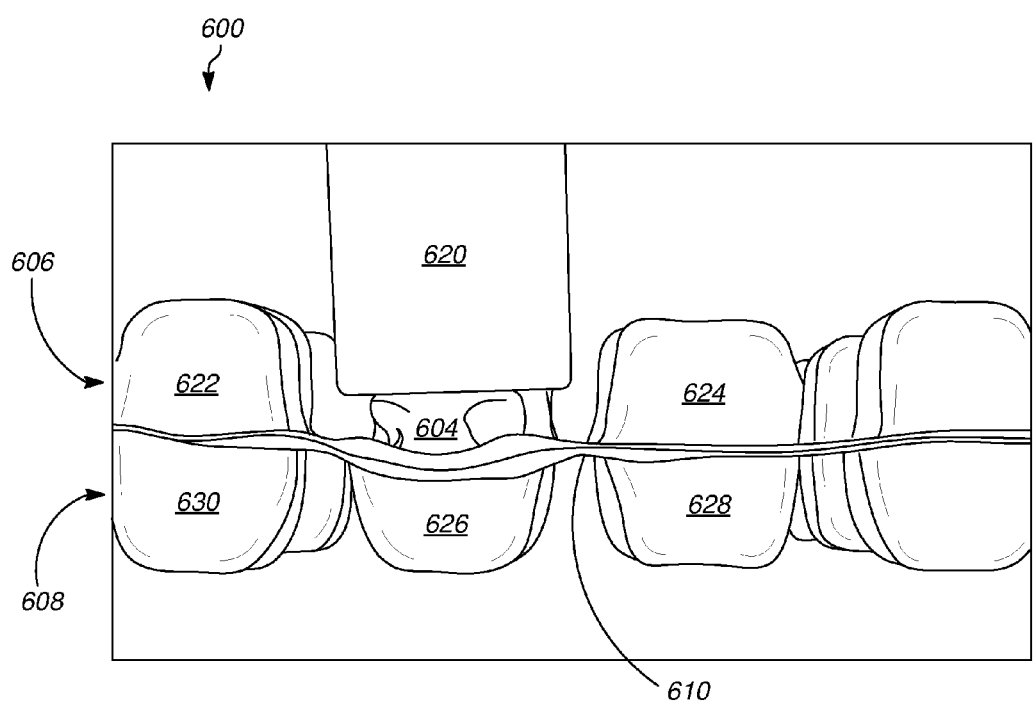
FIG. 6 illustrates an elevation view of an example cellular cushioning system in a partially loaded state.

FIG. 6 illustrates an elevation view of an example cellular cushioning system 600 in a partially loaded state. The cellular cushioning system 600 includes void cells (e.g., void cell 604) arranged in a top matrix 606 and a bottom matrix 608. The top matrix 606 is attached to a top surface of a central or intermedial binding layer 610 and the bottom matrix 608 is attached to a bottom surface of the intermedial binding layer 610. The intermedial binding layer 610 links the void cells together while allowing the void cells to deform independently of one another, at least within an independent compression range of the void cells.

A load is applied to the void cell 604 using a test apparatus 620. The void cell 604 compresses vertically without substantially affecting neighboring void cells (e.g., void cells 622, 624) in the top matrix 606. Further, an opposing void cell 626 in the bottom matrix 608 and neighboring opposing void cells 628, 630 are deflected very little because the intermedial binding layer 610 distributes the point load applied to the void cell 604 to multiple void cells within the bottom matrix 608. Further, the void cells within the bottom matrix 608 may have more or less resistance to compression than the cells in the top matrix 606 to provide a desired relationship between displacement and an applied force (see e.g., FIGS. 13 and 14). If the load were applied to a group of void cells as opposed to the single void cell 604, the group of void cells would be compressed and adjacent void cells to the group of void cells would remain relatively uncompressed. This relationship is referred to herein as decoupling the void cells from one another. The decoupling is only applicable up to a threshold based on an independent compression range, as illustrated by FIG. 7.

Figure 7:
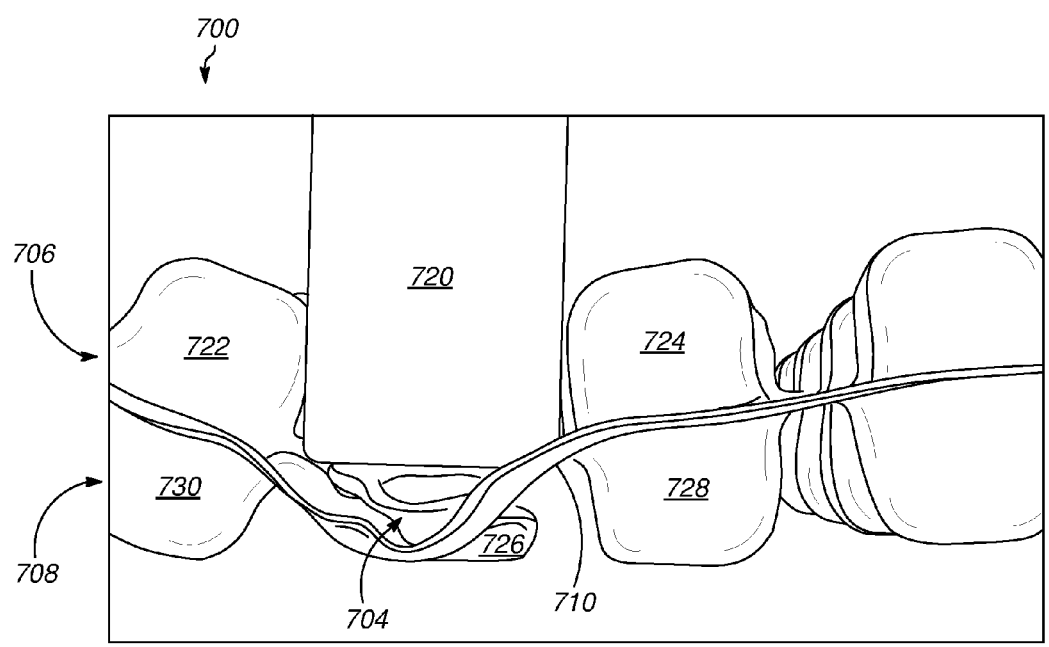
FIG. 7 illustrates an elevation view of an example cellular cushioning system in a fully loaded state.

FIG. 7 illustrates an elevation view of an example cellular cushioning system 700 in a fully loaded state. The cellular cushioning system 700 includes void cells (e.g., void cell 704) arranged in a top matrix 706 and a bottom matrix 708. The top matrix 706 is attached to a top surface of a central or intermedial binding layer 710 and the bottom matrix 708 is attached to a bottom surface of the intermedial binding layer 710. The intermedial binding layer 710 links the void cells together while allowing the void cells to deform independently of one another, at least within an independent compression range of the void cells.

Similar to that shown in FIG. 6, a load is applied to the void cell 704 using a test apparatus 720. The test apparatus 720 is applying a greater force than test apparatus 620 of FIG. 6, and is compressing the cellular cushioning system 700 further. Void cell 704 is fully compressed and opposing void cell 726 is nearly, if not fully compressed. Since the intermedial binding layer 710 is engaged once the void cell 704 is compressed beyond an independent compression threshold, opposing void cell 726 is compressed and neighbor opposing void cells (e.g., void cells 728, 730) are partially compressed via the intermedial binding layer 710. Further, neighbor void cells (e.g., void cells 722, 724) are deflected, but not substantially compressed, by compression of void cell 704. By engaging adjacent void cells, this yields a higher resistance to compression as the cellular cushioning system 700 nears a fully deflected state.

Figure 8:
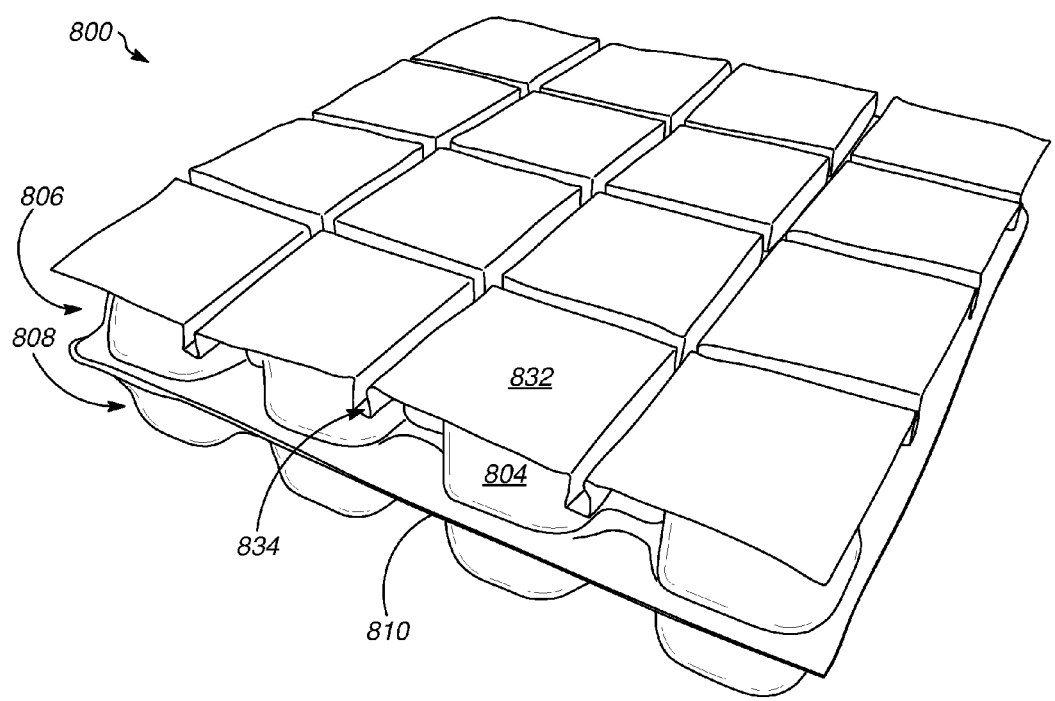
FIG. 8 illustrates a perspective view of an example cellular cushioning system with a pixilated layer.

FIG. 8 illustrates a perspective view of an example cellular cushioning system 800 with a pixilated layer 832. The cellular cushioning system 800 includes void cells (e.g., void cell 804) arranged in a top matrix 806 and a bottom matrix 808. The top matrix 806 is attached to a top surface of a central or intermedial binding layer 810 and the bottom matrix 808 is attached to a bottom surface of the intermedial binding layer 810. The intermedial binding layer 810 links the void cells together while allowing the void cells of the top matrix 806 to deform independently of one another, at least within an independent compression range of the void cells.

The pixilated layer 832 is a thin sheet of material affixed to upper extremities of each of the void cells in the top matrix 806. In other implementations, the pixilated layer 832 is affixed to lower extremities of each of the void cells in the bottom matrix 808. The pixilated layer 832 may be made of similar materials as the void cells and intermedial binding layer 810. The thickness of the pixilated layer 832 may vary according to desired flexibility and durability, for example. The pixilated layer 832 is flat on top of each void cell and has grooves (e.g., groove 834) between each of the void cells. The grooves help maintain independent compression of each of the void cells from adjacent void cells, at least within an independent compression range of the void cells. The groove depth and width may be tailored for an intended independent compression range of the void cells.

Figure 9:
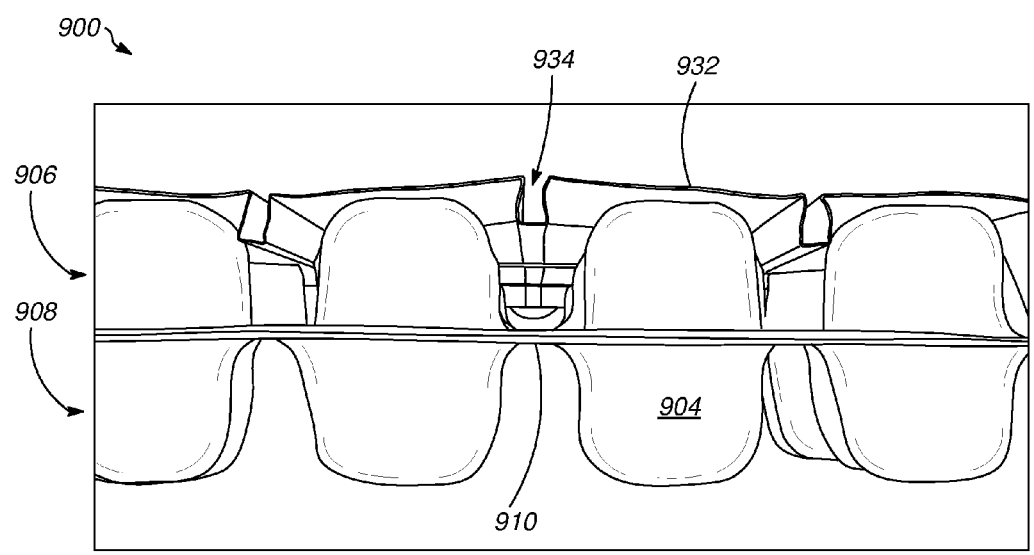
FIG. 9 illustrates an elevation view of an example cellular cushioning system with a pixilated layer in an unloaded state.

FIG. 9 illustrates an elevation view of an example cellular cushioning system 900 with a pixilated layer 932 in an unloaded state. The cellular cushioning system 900 includes void cells (e.g., void cell 904) arranged in a top matrix 906 and a bottom matrix 908. The top matrix 906 is attached to a top surface of a central or intermedial binding layer 910 and the bottom matrix 908 is attached to a bottom surface of the intermedial binding layer 910. The intermedial binding layer 910 links the void cells together while allowing the void cells to deform independently of one another, at least within an independent compression range of the void cells. The pixilated layer 932 is a thin sheet of material affixed to upper extremities of each of the void cells in the top matrix 906. The pixilated layer 932 is flat on top of each void cell and has grooves (e.g., groove 934) between each of the void cells.

Figure 10:
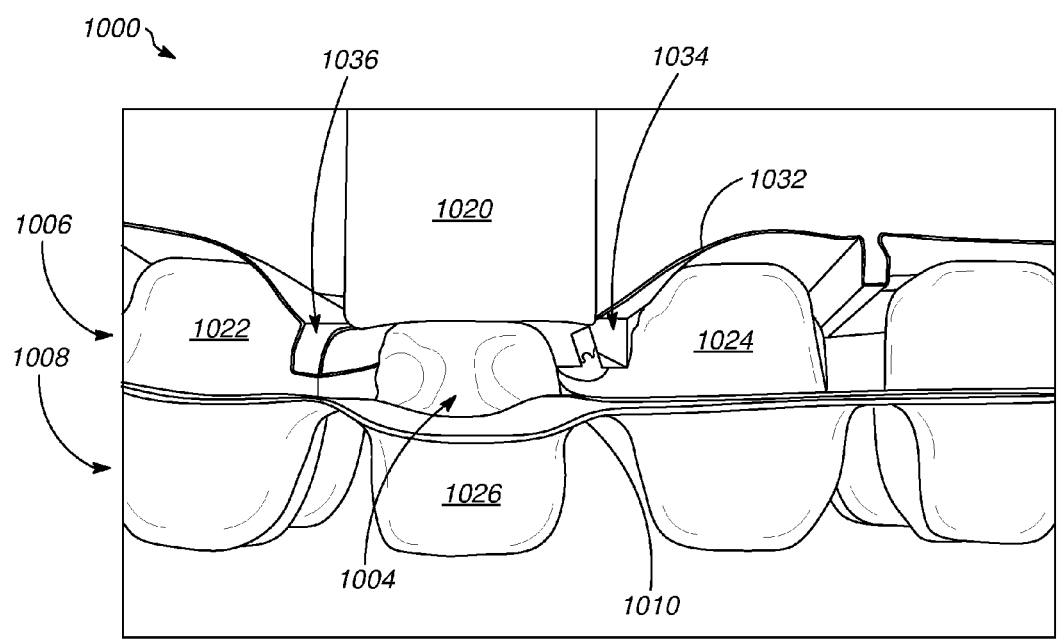
FIG. 10 illustrates an elevation view of an example cellular cushioning system with a pixilated layer in a partially loaded state.

FIG. 10 illustrates an elevation view of an example cellular cushioning system 1000 with a pixilated layer 1032 in a partially loaded state. The cellular cushioning system 1000 includes void cells (e.g., void cell 1004) arranged in a top matrix 1006 and a bottom matrix 1008. The top matrix 1006 is attached to a top surface of a central or intermedial binding layer 1010 and the bottom matrix 1008 is attached to a bottom surface of the intermedial binding layer 1010. The intermedial binding layer 1010 links the void cells together while allowing the void cells to deform independently of one another, at least within an independent compression range of the void cells. The pixilated layer 1032 is a thin sheet of material affixed to upper extremities of each of the void cells in the top matrix 1006. The pixilated layer 1032 is flat on top of each void cell and has grooves (e.g., groove 1034) between each of the void cells.

A load is applied to the void cell 1004 using a test apparatus 1020. The void cell 1004 compresses vertically without substantially affecting neighboring void cells (e.g., void cells 1022, 1024) in the top matrix 1006. While void cells 1004, 1022, 1024 are connected with the pixilated layer 1032, grooves 1034, 1036 spread open or otherwise distort to help prevent deflection of void cell 1004 from substantially affecting the neighboring void cells. Further, an opposing void cell 1026 in the bottom matrix 1008 is deflected very little because it has a higher resistance to compression than cell 1004 and load is distributed via binding layer 1010. If the load were applied to a group of void cells as opposed to the single void cell 1004, the group of void cells would be compressed and void cells adjacent to the compressed group of void cells would remain relatively uncompressed. This relationship is referred to herein as decoupling the void cells from one another. The decoupling is only applicable up to a predetermined deflection, as illustrated by FIG. 11.

Figure 11:
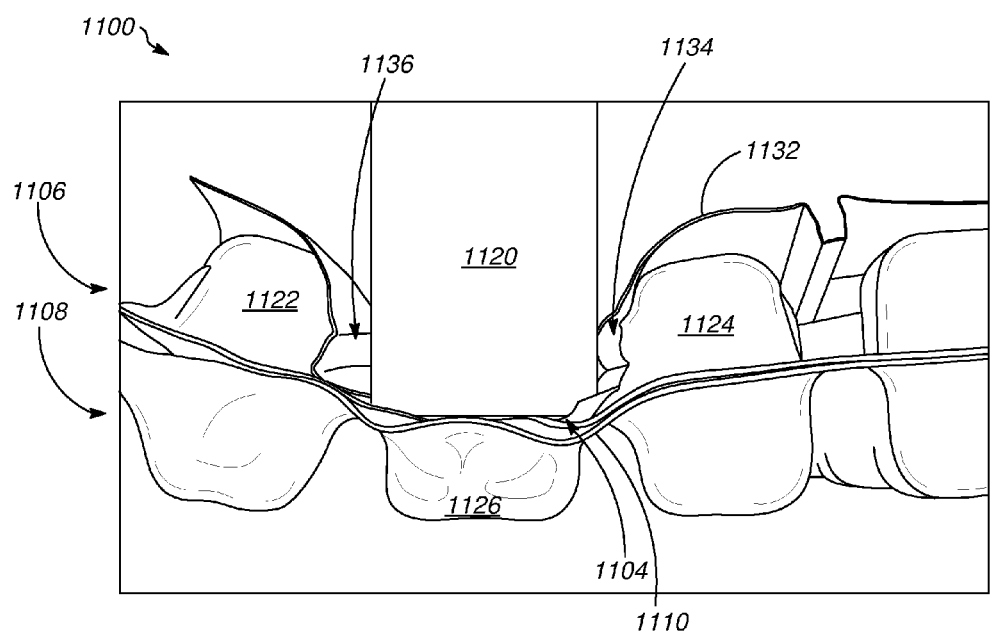
FIG. 11 illustrates an elevation view of an example cellular cushioning system with a pixilated layer in a fully loaded state.

FIG. 11 illustrates an elevation view of an example cellular cushioning system 1100 with a pixilated layer 1132 in a fully loaded state. The cellular cushioning system 1100 includes void cells (e.g., void cell 1104) arranged in a top matrix 1106 and a bottom matrix 1108. The top matrix 1106 is attached to a top surface of a central or intermedial binding layer 1110 and the bottom matrix 1108 is attached to a bottom surface of the intermedial binding layer 1110. The intermedial binding layer 1110 links the void cells together while allowing the void cells to deform independently of one another, at least within an independent compression range of the void cells. The pixilated layer 1132 is a thin sheet of material affixed to upper extremities of each of the void cells in the top matrix 1106. The pixilated layer 1132 is flat on top of each void cell and has grooves (e.g., groove 1134) between each of the void cells.

Similar to that shown in FIG. 10, a load is applied to the void cell 1104 using a test apparatus 1120. The test apparatus 1120 is applying a greater force than test apparatus 1020 of FIG. 10, and is compressing the cellular cushioning system 1100 further. Void cell 1104 is fully compressed and opposing void cell 1126 is nearly, if not fully compressed. While void cells 1104, 1122, 1124 are connected with the pixilated layer 1132, grooves 1134, 1136 unfold and prevent deflection of the void cell 1104 from fully engaging the neighboring void cells, even in a fully deflected state. Since the intermedial binding layer 1110 is engaged once the void cell 1126 is compressed, neighbor opposing void cells in the bottom matrix 1108 are partially compressed by compression of void cell 1104. The depth and width of the grooves within the pixilated layer 1132 affects to what degree deflection of a void cell affects adjacent void cells. By engaging adjacent void cells, this yields a higher resistance to compression as the cellular cushioning system 1100 nears a fully deflected state.

Figure 12:
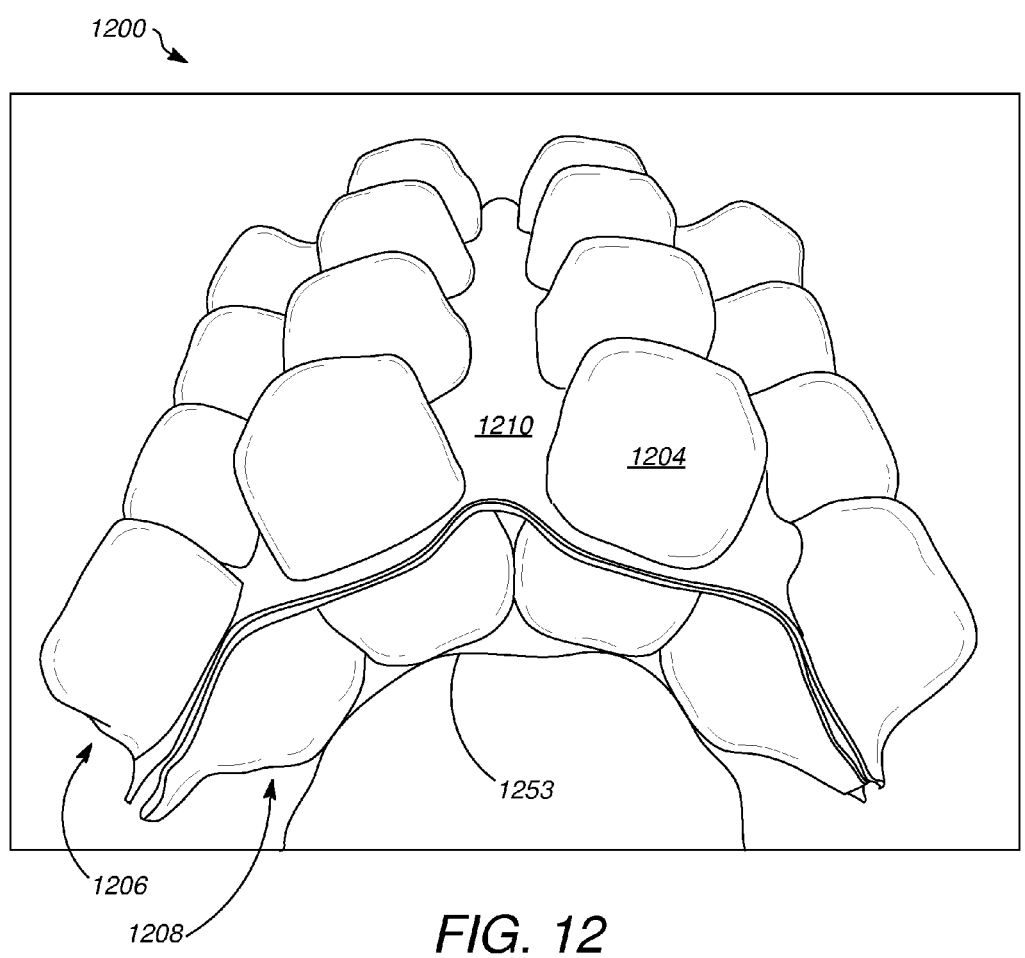
FIG. 12 illustrates a perspective view of an example curved cellular cushioning system.

FIG. 12 illustrates a perspective view of an example curved cellular cushioning system 1200. The cellular cushioning system 1200 includes void cells (e.g., void cell 1204) arranged in a top matrix 1206 and a bottom matrix 1208. The top matrix 1206 is attached to a top surface of a central or intermedial binding layer 1210 and the bottom matrix 1208 is attached to a bottom surface of the intermedial binding layer 1210. The intermedial binding layer 1210 links the void cells together while allowing the void cells to deform independently of one another, at least within an independent compression range of the void cells.

The cellular cushioning system 1200 may be applied over a curved surface 1253 (e.g., an interior of a helmet). Because the intermedial binding layer 1210 is located between the top matrix 1206 and bottom matrix 1208 of void cells, the intermedial binding layer 1210 does not restrict the cellular cushioning system 1200 to planar applications. The cellular cushioning system 1200 may be manipulated to conform to any surface that is to be cushioned from contact with a user's body. Even when the cellular cushioning system 1200 is manipulated to conform to a curved surface, the void cells are still oriented substantially perpendicular to the curved surface. This ensures consistent resistance to compression from the void cells.

Figure 13:
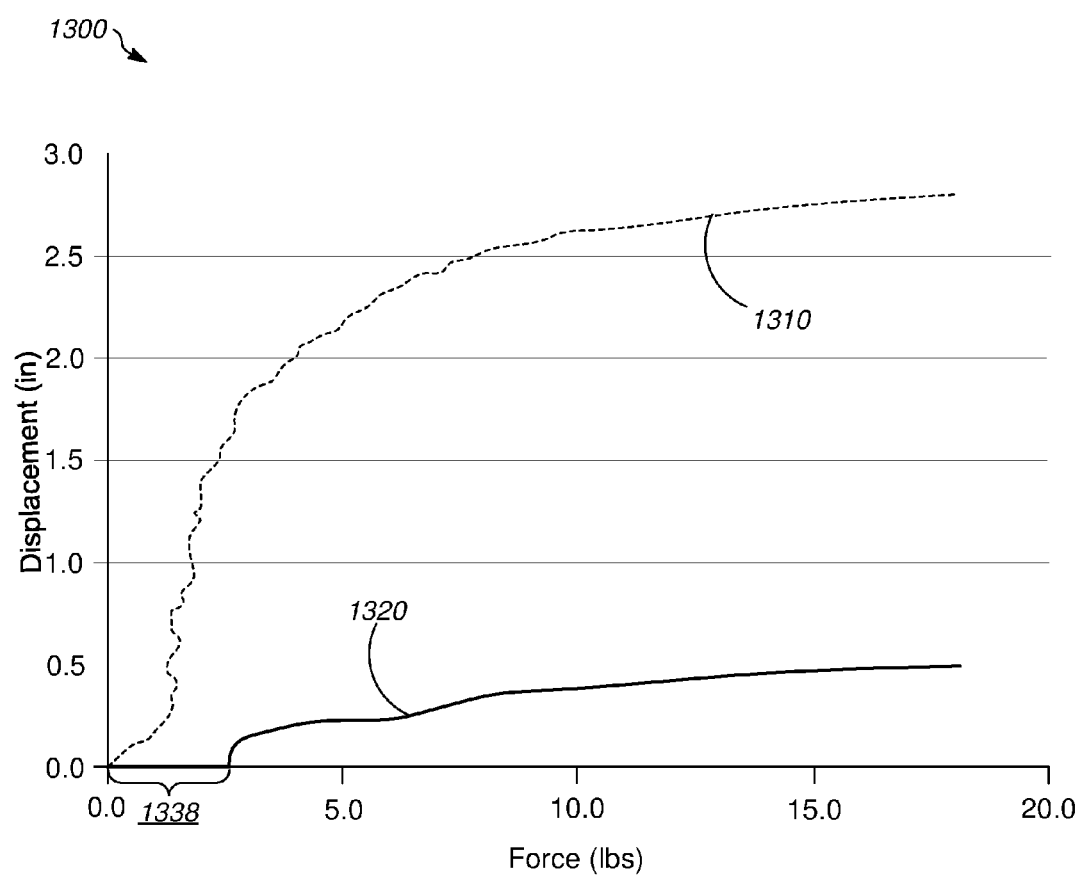
FIG. 13 illustrates a displacement over force graph for neighboring void cells in an example cellular cushioning system.

FIG. 13 illustrates a displacement over force graph 1300 for neighboring void cells in an example cellular cushioning system. The graph 1300 illustrates the relationship between force and displacement of a loaded void cell (dotted line 1310) versus the relationship between force and displacement of neighboring void cells (solid line 1320). At lower forces (e.g., at approximately 0.0-2.5 lbs.), the loaded void cell is compressed significantly with little change in force (i.e., non-spring like behavior or non-compliant with Hooke's Law), at least within an independent compression range of the void cells. As the void cell becomes nearly fully compressed, it takes an increasing amount of force to continue to compress the loaded void cell (e.g., at approximately 2.5-7.5 lbs). When the void cell is nearly fully compressed, it takes a relatively large increase of force to compress the void cell a relatively small additional amount (e.g., approximately 7.5-17.5 lbs).

At smaller compression displacements of the loaded void cell (e.g., 0.0-1.5 in), neighboring void cells are not significantly compressed (e.g., illustrated by independent compression range 1338. As the loaded void cell becomes more compressed (e.g., 1.5-2.7 in), however, the neighboring void cells experience some compression. In one implementation, this is due to deformation of a central or intermedial binding layer and/or pixilated layer associated with both the loaded void cell and the neighboring void cells. However, the relative magnitude of the compression of the neighboring void cells as compared to the loaded void cell remains relatively small (in one implementation, a maximum of approximately 20%). As a result, even under fully or nearly fully loaded conditions, the neighboring void cells in the cellular cushioning system remain mostly independent.

Figure 14:
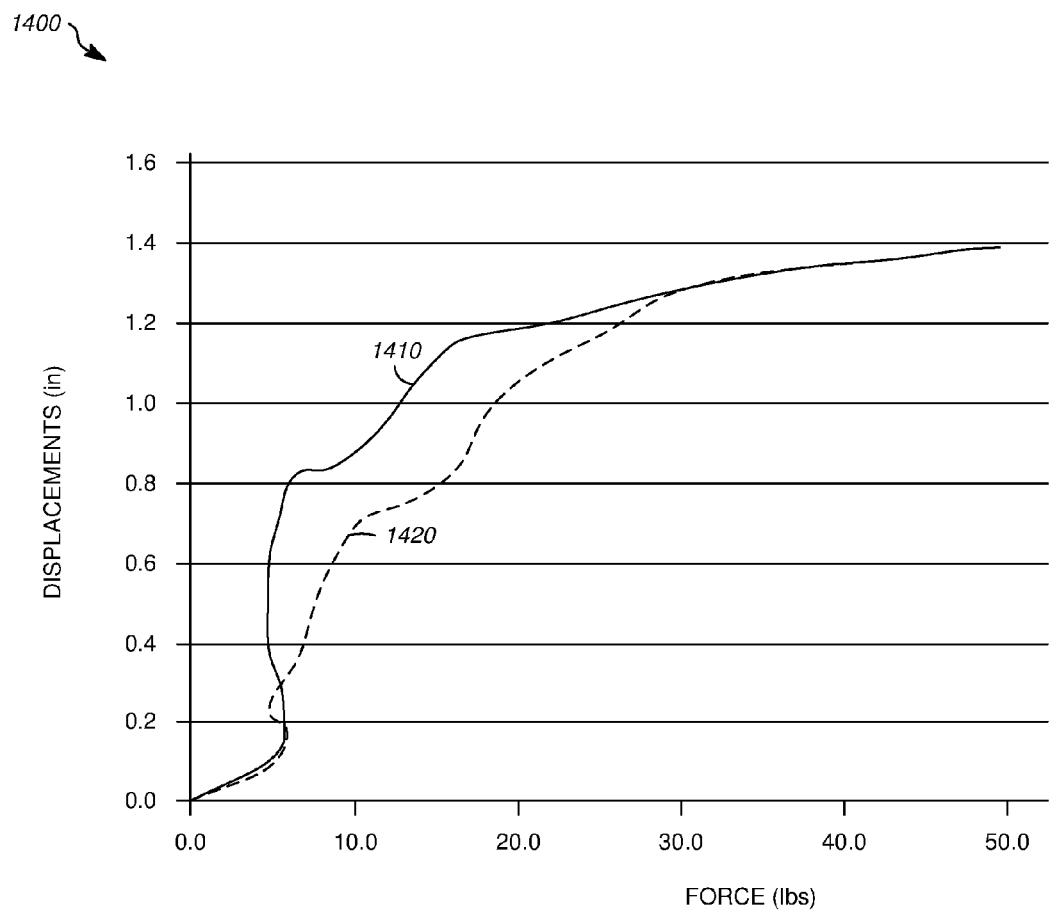
FIG. 14 illustrates a displacement over force graph for opposing void cells in an example cellular cushioning system.

FIG. 14 illustrates a displacement over force graph 1400 for opposing void cells in an example cellular cushioning system. The graph 1400 illustrates the relationship between force and displacement of a void cell in a top matrix of void cells (solid line 1410) versus the relationship between force and displacement of an opposing void cell in a bottom matrix of void cells (dotted line 1420). At lower forces (e.g., at approximately 0.0-5.0 lbs.), the force/displacement relationship of each of the opposing void cells is substantially linear and equal. Above approximately 5.0 lbs., but below approximately 30.0 lbs., the top void cell achieves substantial deflection before the bottom void cell. Above 30.0 lbs., the force/displacement relationship of each of the opposing void cells is again substantially linear and equal.

In other implementations, the void cell in the top matrix of void cells will have an independent compression range within which the opposing void cell in the bottom matrix of void cells is substantially uncompressed, similar to the relationship between neighboring void cells as illustrated in FIG. 13.

Figure 15:
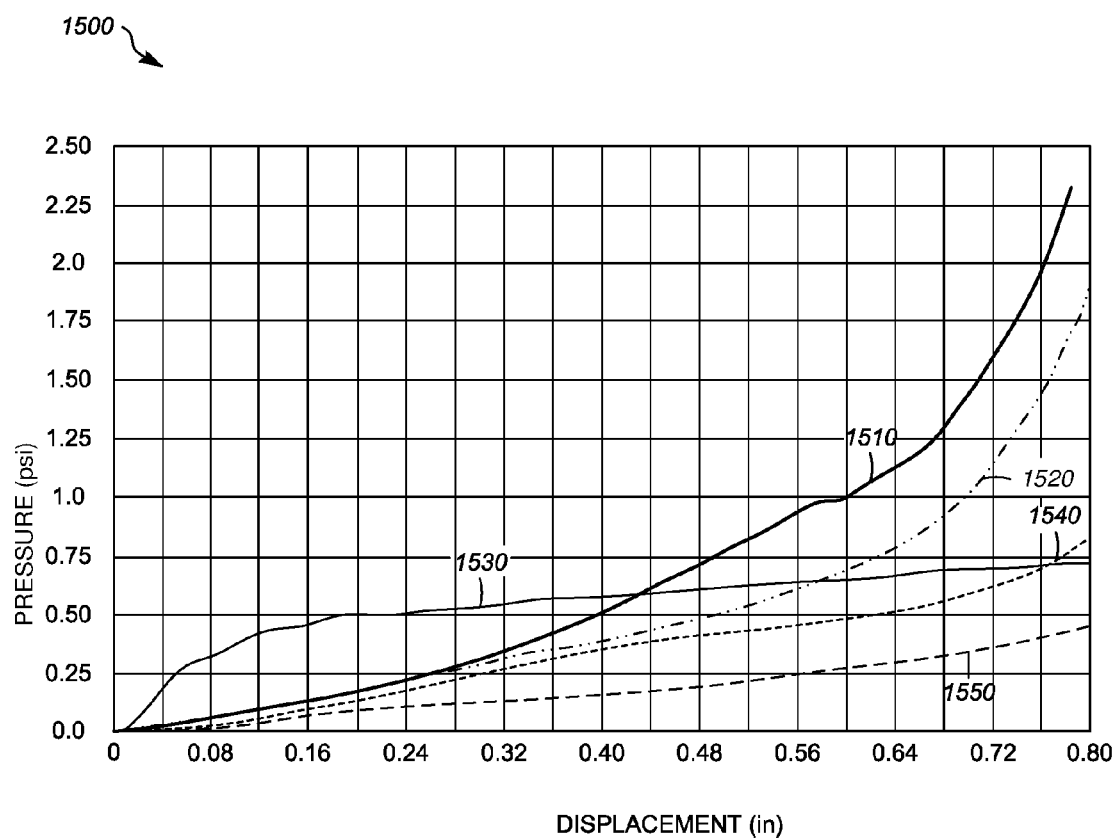
FIG. 15 illustrates a pressure over displacement graph for two example cellular cushioning systems compared to three other cushioning systems.

FIG. 15 illustrates a pressure over displacement graph 1500 for two example cellular cushioning systems compared to three other cushioning systems. The graph 1500 illustrates the relationship between pressure applied to the cushioning systems and compressive displacement of the cushioning systems. Line 1510 represents a first example thermoplastic elastomer cellular cushioning system with 0.5" wide, tall, and deep square void cells. Further, the void cells are aligned and opposing each other with a 25 mil wall thickness. Line 1520 represents a second example cellular cushioning system with 0.5" wide, tall, and deep flat top square void cells. The void cells are offset and opposing each other with a 25 mil wall thickness. Line 1530 represents a 2.0" thick reticulated urethane comfort foam used in mattress applications and lines 1540 and 1550 each represent represent a convoluted comfort foam mattress topper.

Lines 1510 and 1520, which represent cellular cushioning systems, as disclosed herein illustrate that a relatively low pressure is required to cause displacement (e.g., from 0 to about 0.4 inches) of the cellular cushioning systems as compared to the foam illustrated by line 1530). This may enhance user comfort under lower load conditions. Further, under higher load conditions (e.g., from about 0.4 to about 0.8 inches), lines 1510 and 1520 illustrate that the cellular cushioning systems exhibit a relatively high pressure required to cause additional displacement of the cellular cushioning systems as compared to all three foams (lines 1530, 1540, and 1550). As a result, the cellular cushioning systems are able to offer a user greater support under higher load conditions than any the foam systems and better comfort to the user under low load conditions than at least one of the foam systems.

Figure 16:
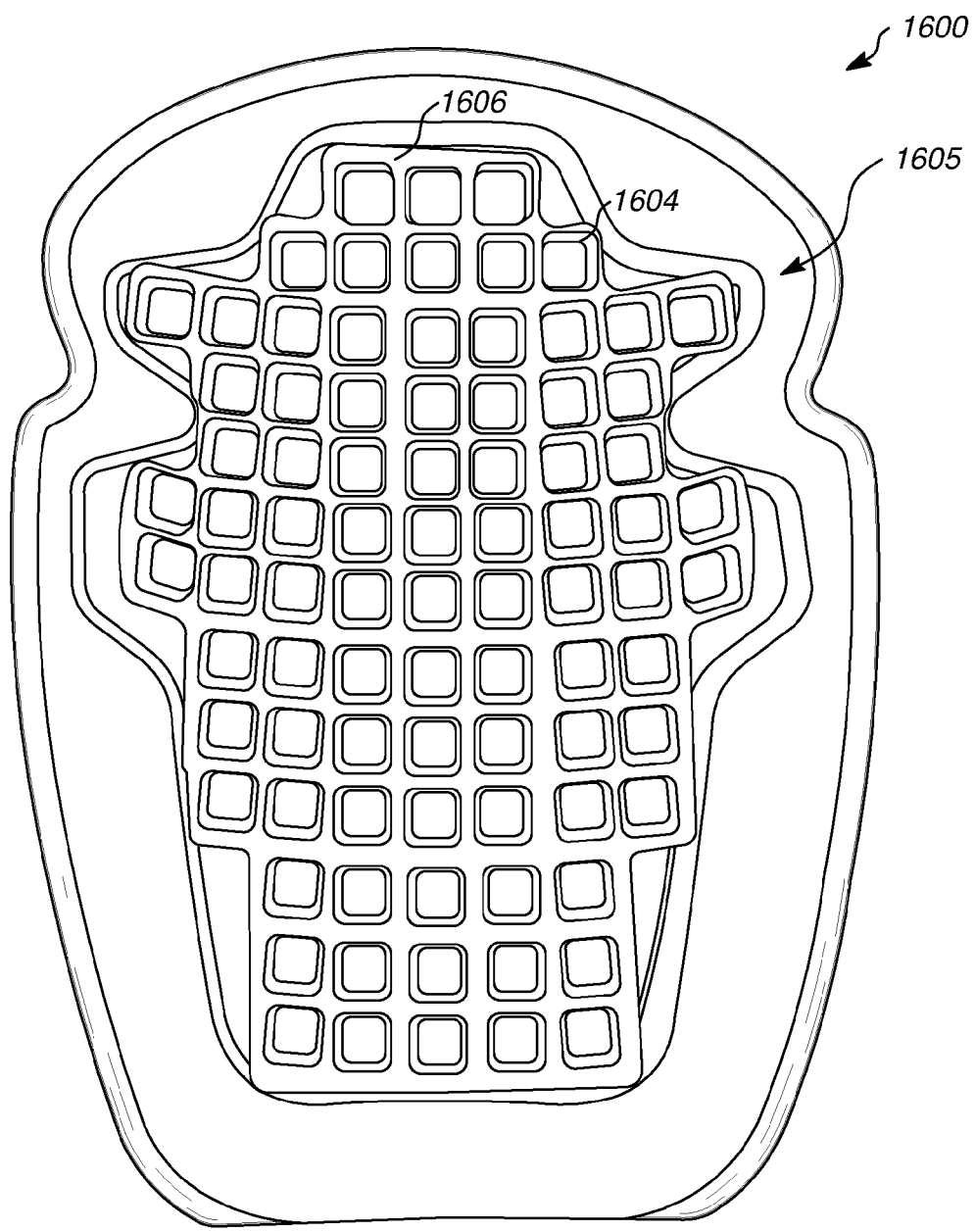
FIG. 16 illustrates a kneepad incorporating an example cellular cushioning system.

FIG. 16 illustrates a kneepad 1600 incorporating an example cellular cushioning system 1605. The cellular cushioning system 1605 includes void cells (e.g., void cell 1604) or support units arranged in a top matrix and a bottom matrix (not shown). The cellular cushioning system 1600 is depicted conforming to a curved inner surface of the kneepad 1600. In various implementations, the kneepad 1600 is rigid, semi-rigid, or flexible, depending on the purpose of the kneepad 1600. The top matrix is attached to a top surface of a central or intermedial binding layer 1610 and the bottom matrix is attached to a bottom surface of the intermedial binding layer 1610. The intermedial binding layer 1610 links the void cells together while allowing the void cells to compress independently of one another, at least within an independent compression range of the void cells (as discussed in detail above).

In one implementation, each of the void cells are individually attached to the intermedial binding layer 1610 and not to each other. Further, each of the void cells within the top matrix are individually compressible under load without compression of adjacent (i.e., neighboring, opposing, and/or neighbor opposing) void cells, within the independent compression range of the void cells. Outside of the independent compression range, compression of an individual void cell causes adjacent void cells to compress via deflection of the intermedial binding layer 1610. For example, void cells forming the top matrix conform to the surface contour of a user's knee and individually compress and distribute a load on the user's knee evenly over those areas.

Each of the void cells creates a relatively constant force to resist deflection. In one implementation, the void cells in the bottom matrix have a higher resistance to deflection that the void cells in the top matrix. As a result, in less highly loaded areas (e.g., sides of the user's knees), only void cells in the top matrix are engaged and the user's weight is distributed evenly over contact of the user with the cellular cushioning system 1605. In more compressed areas (e.g., the center of the user's knees), the user experiences increased pressure because the user's weight is sufficient to additionally deflect the intermedial binding layer 1610 and thus engage the void cells in the bottom matrix. Resistance to deflection of the individual void cells within the top and/or bottom matrices may be varied according to expected loading of the kneepad 1600.

Figure 17:
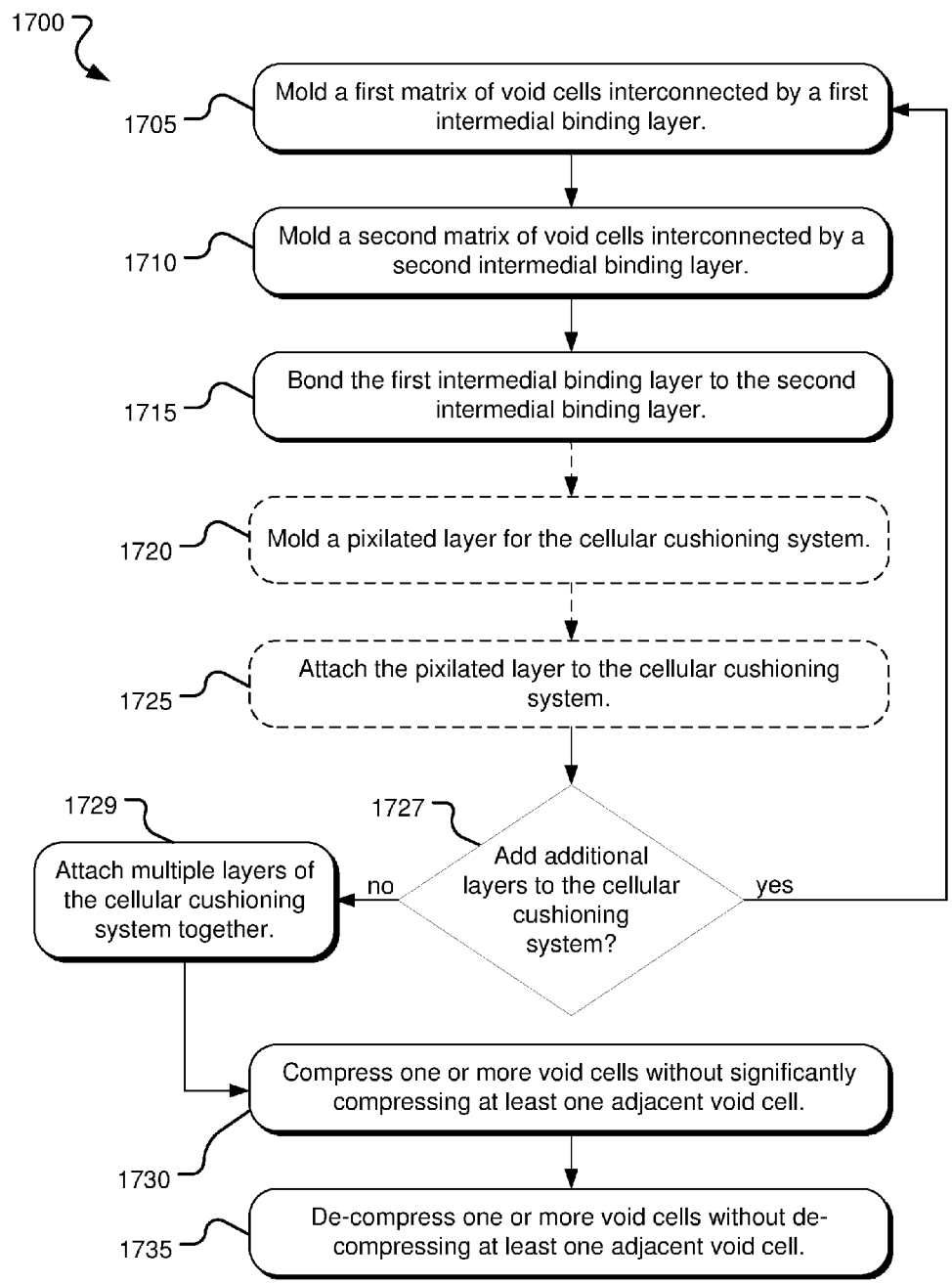
FIG. 17 illustrates example operations for manufacturing and using a cellular cushioning system.

FIG. 17 illustrates example operations 1700 for manufacturing and using a cellular cushioning system. A first molding operation 1705 molds a first matrix of void cells interconnected by a first planar intermedial binding layer. A second molding operation 1710 molds a second matrix of void cells interconnected by a second planar intermedial binding layer. The intermedial binding layers may have openings at each of the void cells. In another implementation, the matrices of void cells are formed simultaneously from a sheet of material using a blow molding tube (e.g., parison tube). In yet other implementation, the first matrix of void cells and second matrix of void cells are interconnected by singular planar intermedial binding layer.

A bonding operation 1715 bonds a face of the first planar intermedial binding layer to a face of the second planar intermedial binding layer with the matrices of void cells extending away from the planar intermedial binding layers. In one implementations, the bonding operation 1715 results in a single intermedial binding layer linking the first matrix of void cells and the second matrix of void cells together. In another implementation, the bonding operation 1715 periodically tack welds the intermedial binding layers together resulting in two distinct binding layers fixedly attached together. Periodically bonding the intermedial binding layers together may leave fluid passageways between the void cells lying between the intermedial binding layers.

Further, the first and second intermedial binding layers may be laminated together such that openings in opposing void cells in the first half and second half of the cellular cushioning system meet one another. Alternatively, the first half and second half of the cellular cushioning system may be manufactured in one step using any known manufacturing techniques. Further, the first half and second half of the cellular cushioning system may be manufactured using techniques other than molding (e.g., vacuum forming, pressure forming, and extruding).

In implementations utilizing a pixilated layer, an optional molding operation 1720 molds the pixilated layer for the cellular cushioning system. The pixilated layer is generally planar with a series of channels that frame areas of the pixilated layer generally corresponding to the sizes and positions of individual void cells in the first and/or second matrices of void cells. The pixilated layer is further configured with a thickness, stiffness, channel depth, channel width to achieve a desired degree of independent compression of the individual void cells. If the pixilated layer is utilized, optional attaching operation 1725 attaches the pixilated layer to an outer surface of either the first or the second matrices of void cells oriented generally parallel to the planar intermedial binding layer. The pixilated layer may be attached by being glued, welded, or using any other attachment methods. Further, two pixilated layers may be used, one attached to the first matrix of void cells and a second attached to the second matrix of void cells.

A decision operation 1727 decides if the cellular cushioning system needs additional layers of void cells bound together with a binding layer. If yes, operations 1705 through 1727 are repeated. If no, attaching operation 1729 attaches the multiple layers of the cellular cushioning system together. If there is only one layer of the cellular cushioning system, operation 1729 is inapplicable.

A compressing operation 1730 compresses one or more of the void cells within an independent compression range without significantly compressing one or more adjacent void cells. Adjacent void cells include one or more of neighboring void cells, opposing void cells, and neighbor opposing void cells. In one implementation, the neighboring void cells are fluidly connected by dedicated passages or merely gaps between the first and second intermedial binding layers. This allows the air or other fluid within the compressed void cell to enter and exit the void cell.

The independent compression range is the displacement range of the compressed void cell that does not significantly compress adjacent void cells. The void cell is compressed in a general direction substantially normal to the intermedial binding layers. If the void cell is compressed beyond the independent compression range, the intermedial binding layers will be deflected and/or the void cells adjacent the compressed void cell will be compressed. In one implementation, even after the independent compression displacement is exceeded, the void cells adjacent the compressed void cell are compressed significantly less than the compressed void cell itself. Further, multiple void cells may be compressed in compressing operation 1725.

A de-compressing operation 1735 de-compresses one or more compressed void cells without substantially de-compressing at least one adjacent compressed void cell, so long as the de-compressed void cell is within its independent compression range. If the de-compressed void cell is outside its independent compression range, adjacent void cells will also de-compress until the de-compressed void cell returns within its independent compression range. If the de-compressed void cell is de-compressed to a zero load, the cellular cushioning system will return to its original state. In other implementations, the cellular cushioning system may be permanently deformed (e.g., in a one-time use cellular cushioning system).

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet other embodiments without departing from the recited claims.

What is claimed is:

1. A method comprising:
    applying a cushioning material to a curved surface shaped to provide support for a portion of a human body, the material comprising a first matrix of void cells opposing a second matrix of void cells, wherein at least two of the void cells in the first matrix are coupled to at least two of the void cells in the second matrix via an intermedial binding layer and at each void cell of the first matrix and the second matrix includes an opening in continuous fluid communication with an environment external to the cushioning material; and
    compressing a void cell within the first matrix outside of an independent compression range of the cushioning material to deflect the intermedial binding layer and compress at least one neighboring void cell within the first matrix, and wherein the cushioning material provides a barrier between the portion of the human body and the curved surface.

2. The method of claim 1, wherein compressing the void cell within the first matrix outside the independent compression range of the cushioning material compresses an opposing void cell in the second matrix of void cells.

3. The method of claim 1, wherein compressing the void cell within the first matrix outside the independent compression range of the cushioning material requires greater force than compressing the void cell within the independent compression range.

4. The method of claim 1, wherein each void cell in the first matrix of void cells has a substantially equal resistance to deformation at all deformation magnitudes within the independent compression range.

5. The method of claim 1, wherein each void cell in the first matrix of void cells has an increased resistance to deformation with increased deformation magnitude outside the independent compression range.

6. The method of claim 1, wherein the void cells in the first matrix have a higher resistance to deflection than the void cells in the second matrix.

7. An apparatus comprising:
a curved surface shaped to provide support for a portion of a human body;
a cellular cushioning material that provides a barrier between the portion of the human body and the curved surface, the cellular cushioning material including:
a first matrix of void cells;
a second matrix of void cells opposing the first matrix of void cells, each void cell of the first matrix and the second matrix including an opening in continuous fluid communication with an environment external to the cushioning material; and
an intermedial binding layer coupling at least two of the void cells in the first matrix to at least two of the void cells in the second matrix, wherein compression of a void cell within the first matrix outside of an independent compression range of the cushioning material deflects the intermedial binding layer and compresses at least one neighboring void cell within the first matrix.

8. The apparatus of claim 7, wherein the cushioning material conforms to the curved surface of an adjacent object.

9. The apparatus of claim 7, wherein each of the void cells in the first matrix have an open face that faces an open face of each of the void cells in the second matrix, wherein the open faces in the first matrix generally align with the open faces in the second matrix.

10. The apparatus of claim 7, wherein compression of a void cell within the first matrix in a direction substantially normal to the intermedial binding layer occurs without substantial deflection of at least one neighboring void cell in the first matrix and at least one opposing void cell in the second matrix.

11. The apparatus of claim 10, wherein de-compression of the void cell occurs without de-compression of the neighboring void cell.

12. The apparatus of claim 7, wherein compression of the void cell outside the independent compression range requires greater force than compression of the void cell within the independent compression range.

13. The apparatus of claim 7, wherein the intermedial binding layer has an opening where each void cell meets the intermedial binding layer.

14. The apparatus of claim 7, wherein the intermedial binding layer includes a first half that couples the first matrix of void cells together and a second half that couples the second matrix of void cells together, and wherein the first half and the second half are attached together.

15. The apparatus of claim 14, wherein the first half and the second half are attached together using periodic spot welds of the first half to the second half.

16. The apparatus of claim 7, wherein the curved surface is a surface of at least one of a knee pad and a helmet.

17. A method of manufacturing a wearable article comprising: creating a cellular cushion by:
molding a first matrix of void cells open toward and interconnected by a first intermedial binding layer;
molding a second matrix of void cells open toward and interconnected by a second intermedial binding layer, each void cell in the first matrix and the second matrix including an opening in continuous fluid communication with an environment external to the cellular cushioning system; and
welding the first and the second intermedial binding layers together so that openings in the void cells of the first matrix and the second matrix face one another;
placing the cellular cushion adjacent a curved surface shaped to provide support for a portion of a human body such that the cellular cushioning material provides a barrier between the portion of the human body and the curved surface.

18. The method of claim 17, further comprising:
molding a pixilated layer; and
attaching the pixilated layer to an outer surface of each void cell of the first matrix of void cells.

19. The method of claim 17, further comprising:
compressing a void cell in the first matrix in a direction substantially normal to the first intermedial binding layer without substantial deflection of at least one neighboring void cell in the first matrix and at least one opposing void cell in the second matrix.

* * * * *